Figure 1:
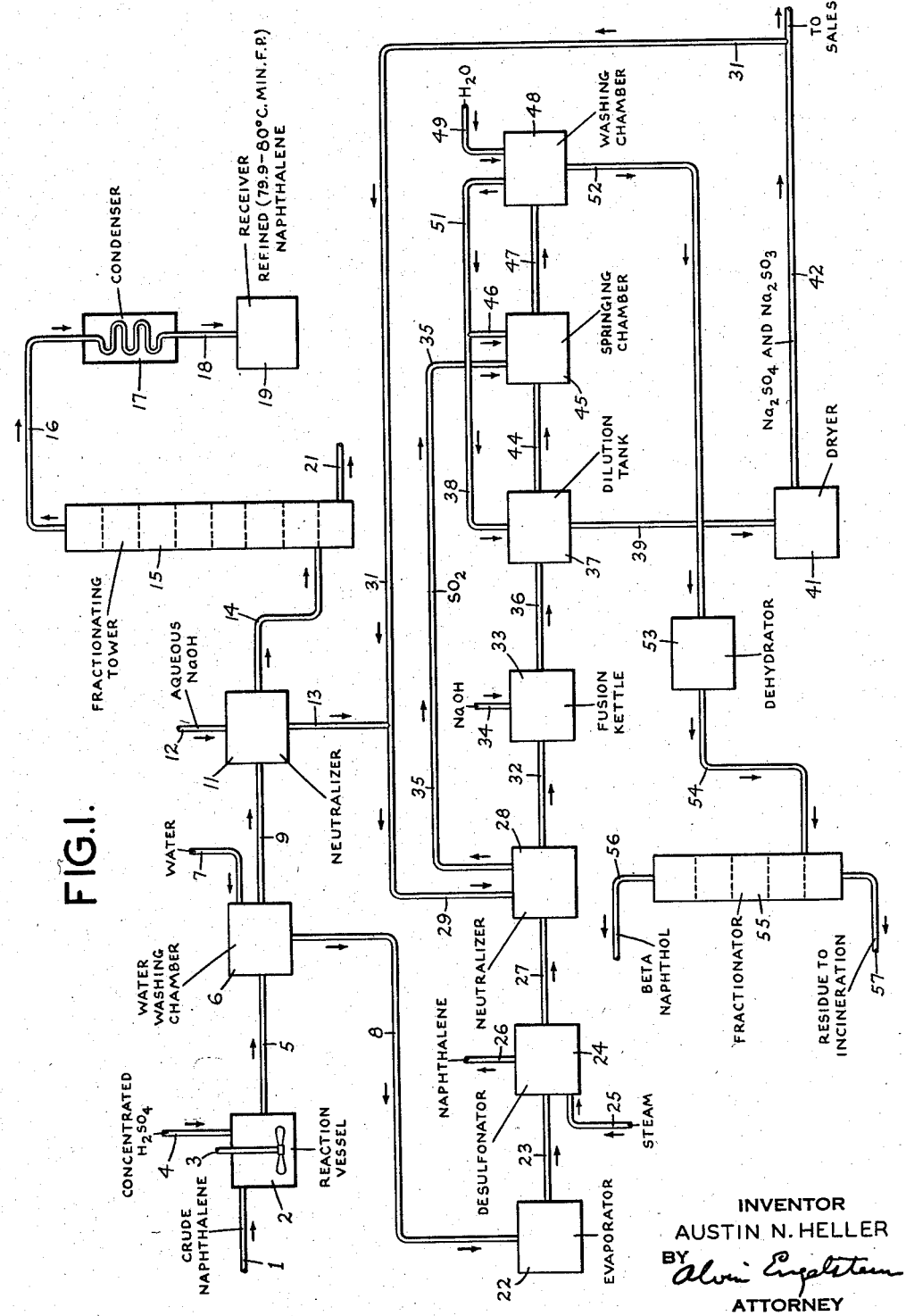

April 28, 1959          A. N. HELLER          2,884,463
PROCESS FOR PRODUCTION OF HIGH GRADE NAPHTHALENE
AND PREPARATION OF β-NAPHTHOL FROM
ACIDIC WATERS THEREFROM Filed June 26, 1957          2 Sheets-Sheet 1

FIG.I.

INVENTOR
AUSTIN N. HELLER
BY *Alvin Engelstein*
ATTORNEY

United States Patent Office 2,884,463
Patented Apr. 28, 1959

2,884,463

PROCESS FOR PRODUCTION OF HIGH GRADE NAPHTHALENE AND PREPARATION OF β-NAPHTHOL FROM ACIDIC WATERS THEREFROM

Austin N. Heller, Ramsey, N.J., assignor to Allied Chemical Corporation, New York, N.Y., a corporation of New York Application June 26, 1957, Serial No. 668,085

5 Claims. (Cl. 260—628)

This invention relates to treating naphthalene and more particularly refers to a new and improved method of refining crude naphthalenes for the production of high grade naphthalene and substantial amounts of β-naphthol.

In early units for the preparation of crude naphthalene from coal tar, tar distillation fractions boiling between 200° C. and 250° C. were chilled, the crystallized naphthalene separated from the oil and then washed with hot water in centrifugals or hot pressed in hydraulic presses to remove adhering oil. More recent practice has been to collect a coal tar fraction boiling between 200° C. and 250° C., wash with aqueous caustic, and distill to produce naphthalene having a 73° C. freezing point. This naphthalene is crystallized from aqueous caustic to yield "whizzed naphthalene" having a 78° C. freezing point. In some modern units the coal tar fraction boiling between 200° C. and 250° C. is washed with aqueous caustic and fractionated in an efficient column to yield "distilled naphthalene" having a 78° C. freezing point. To produce refined naphthalene, the 78° C. freezing point naphthalene is treated several times at about 90° C. with concentrated sulfuric acid, washed repeatedly with water, neutralized with aqueous caustic and finally redistilled to yield refined naphthalene with a 79.6° C. minimum freezing point.

The conventional method for producing refined naphthalene from crude naphthalene is complex and a somewhat wasteful process. Acid sludges are produced in acid-treating crude naphthalene and these sludges are conventionally discarded although they may conceivably be incinerated to recover their $H_2SO_4$ values. Sulfonic acids present in the sludge are entirely destroyed by either procedure. Besides the loss of acid sludges in conventional naphthalene refining, an equally undesirable processing waste results from discharging the acidic rinse water and soda sludges. These wash waters are too dilute for profitable recovery and too copious to permit economical neutralization. Combined wash waters and acid sludges, due to their high acidity and organic constituents may cause water pollution problems if discharged into a receiving stream.

Furthermore, the refined naphthalene conventionally produced is not of especially high quality, usually barely meeting the freezing point specification of 79.6° C. To improve the quality of such refined naphthalene requires special expensive treatment and consequently the cost of high grade naphthalene of 79.9° C.–80.0° C. freezing point commands an appreciably higher market price.

An object of the present invention is to provide a method of refining naphthalene under conditions eliminating certain conventionally encountered wastes and producing sidestreams amenable to conversion to β-naphthol.

Another object is to provide a method for producing refined naphthalene of consistently high quality, with high (79.9° C. minimum) F.P., exceptionally low sulfur content, improved visual appearance and color stability and superior heat stability.

A further object is to provide a method for refining naphthalene involving no acid sludges.

A still further object is to provide a method of refining naphthalene at high temperatures and of treating certain aqueous wastes resulting from such refining operations so as to obtain economically attractive yields of β-naphthol while substantially eliminating water pollution normally associated with such refining. Other objects and advantages will be apparent from the accompanying drawing and following description.

In accordance with the present invention, naphthalene of exceptionally high purity (79.9° C.–80.0° C. minimum freezing point) may be obtained by mixing crude naphthalene with 10–25, preferably 14–20, parts by weight of crude naphthalene of concentrated sulfuric acid containing 90–100%, preferably 93–96%, $H_2SO_4$ at a temperature of 150–170° C., preferably 155–165° C., and continuing the mixing of the crude naphthalene and sulfuric acid to form essentially a single phase, i.e., a homogeneous mixture that does not separate into layers, thereafter adding water to the single phase mixture at a temperature of 80–100° C., preferably 85–95° C., to form two phases, an aqueous phase termed "acid waters" containing naphthalene sulfonic acids and impurities in the form of water-soluble sulfonated polymers and a naphthalene phase; withdrawing the aqueous phase, washing the thus separated naphthalene phase with a dilute aqueous caustic solution, withdrawing the aqueous caustic solution after contact with the naphthalene, and fractionally distilling the thus treated naphthalene and recovering as distillate a high quality naphthalene of exceptionally low sulfur content, good color stability and superior heat stability.

In another embodiment of the invention, the single phase mixture of crude naphthalene and sulfuric acid is countercurrently washed with a dilute aqueous solution of sodium sulfate at a temperature slightly above 80° C., at which temperature visible crystals of naphthalene begin to form. The fine naphthalene crystals separate out as an upper layer due to the higher density of the aqueous solution of sodium sulfate and the separated naphthalene crystals are washed with an aqueous caustic solution and the washed naphthalene fractionally distilled to produce refined naphthalene of high quality.

The present invention further permits increasing the available supply of β-naphthol, which is an intermediate for the industrial manufacture of dyes and pharmaceuticals, from the acid waters and caustic wash, normally waste by-products resulting from production of refined naphthalene as described above. β-Naphthol is also employed for preparing an important rubber antioxidant (N-phenyl-2-naphthylamine) and is used medicinally as a parasiticide and anthelmintic. The normal process for manufacturing β-naphthol requires use of relatively costly refined naphthalene of 79.6° C. freezing point while the present invention utilizes readily available by-product wastes from refining crude naphthalene having 78° C. freezing point.

Accordingly, acid water, produced as by-product in the purification of crude naphthalene in accordance with the present invention, may be converted into additional yields of naphthalene and β-naphthol by first concentrating the acid water, thereafter, if desired, passing steam in direct contact with the concentrated acid water at a temperature of 150–170° C. to thereby convert naphthalene-1-sulfonic acid contained in relatively small amount in the acid water to naphthalene which latter is removed by vaporization and recovered. The residual waste water containing a substantial amount of naphthalene-2-sulfonic acid is neutralized with an alkali water, aqueous caustic produced as a by-product in the acid purification of naphthalene, and a mixture of sodium sulfate and sodium sulfite, thereby producing sodium naphthalene-2-sulfonate and liberating sulfur dioxide gas and, the sodium naphthalene-2-sulfonate then being fused with sodium hydroxide at a temperature of about 290–350° C., thereby effecting desulfonation of the sodium naphthalene-2-sulfonate. The melt is diluted with water and then acidified with the sulfur dioxide gas released from the reaction. As a result of this acidification, there is formed β-naphthol which separates as one layer and an aqueous solution of sodium sulfate and sodium sulfite which may be recycled in the process for neutralizing the naphthalene-2-sulfonic acid and produce the sodium naphthalene-2-sulfonate. The β-naphthol may then be purified by washing with water, dehydration, residue-freeing and/or fractionation.

Figure 2:
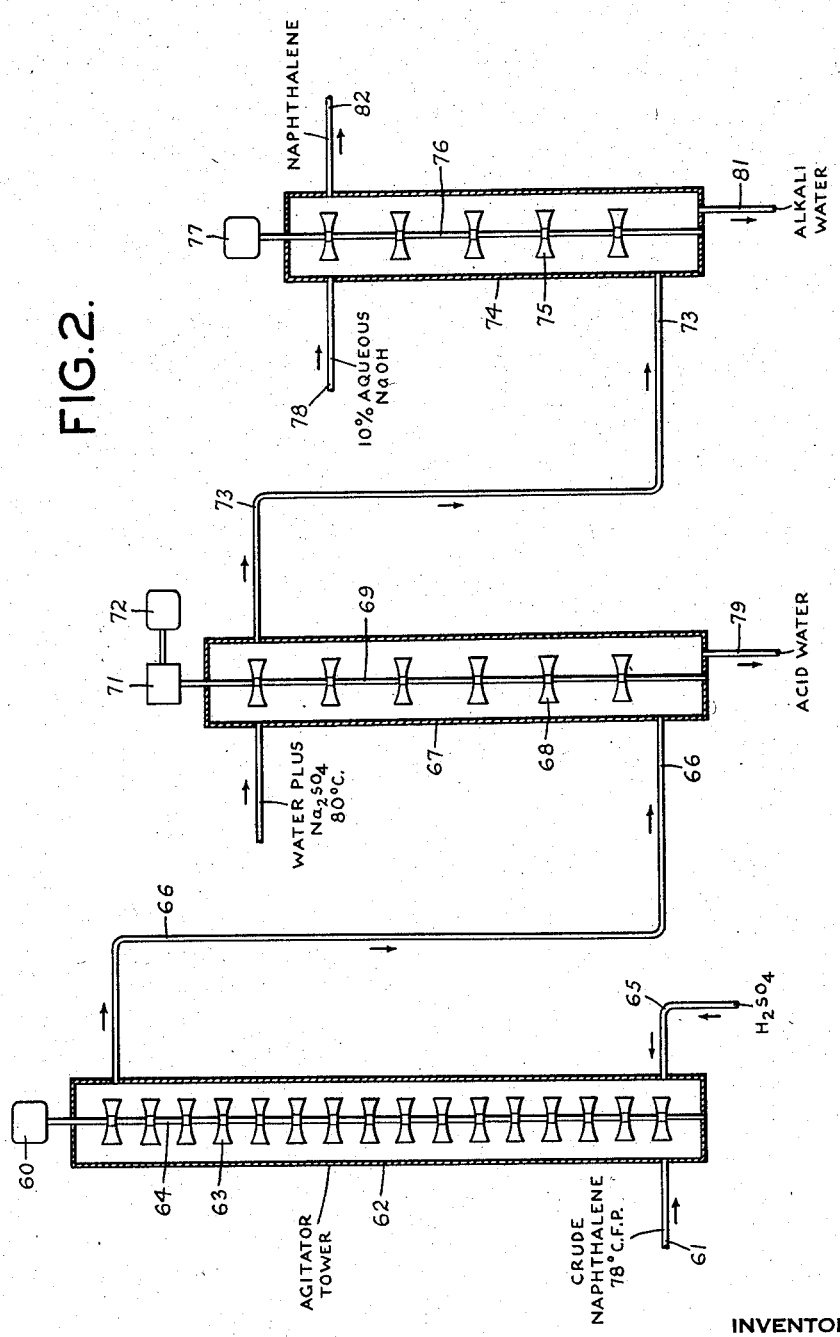

Figure 1 diagrammatically illustrates one method of carrying out the present invention. Figure 2 illustrates another and alternate embodiment of the present invention.

Referring to Figure 1, crude naphthalene (77.7°–78.0° C. freezing point) is delivered through line 1 to reaction vessel 2 provided with stirrer 3. Concentrated sulfuric acid in an amount of 10–25 parts by weight of crude naphthalene is introduced through line 4 into reaction vessel 2 and the mixture agitated at a temperature of 150–170° C. to effect intimate contact between the crude naphthalene and sulfuric acid and to form a homogeneous mass, i.e. a single phase with no separation of acid sludges. Ordinarily, formation of a single phase with reaction of the acid on the impurities in the crude naphthalene will be completed in about ½–2 hours. The single phase naphthalene-$H_2SO_4$ mixture is transferred through line 5 to water washing chamber 6 wherein the single phase material at a temperature of 80–100° C. is admixed with water, usually an amount of 25–50% water by volume of the naphthalene charged will be adequate, entering through line 7 and the mixture upon standing separates into a bottom aqueous layer termed "acid water" containing the naphthalene sulfonic acids and impurities and an upper naphthalene layer from which the impurities have been removed. The acid water is discharged from the bottom of chamber 6 through line 8. The naphthalene layer is delivered through line 9 to neutralizer 11 into which an aqueous solution of sodium hydroxide is introduced through line 12 contacted with the naphthalene and the mixture thereafter permitted to settle into a lower aqueous caustic layer which is discharged through line 13 and an upper naphthalene layer. The treated naphthalene from neutralizer 11 is sent through line 14 into fractionating tower 15 wherein naphthalene is vaporized and taken overhead through line 16, condensed in condenser 17, and then delivered through line 18 into receiver 19. The distilled naphthalene in receiver 19 will have a 79.9–80.0° C. minimum freezing point. The residue consisting principally of a small amount of polymers collecting in the bottom of fractionating tower 15 may be discharged through line 21.

Acid water from water washing chamber 6 is delivered through line 8 to evaporator 22 wherein the acid waters are concentrated. Concentrated acid water from evaporator 22 is directed through line 23 to desulfonator 24 wherein the acid waters are maintained at a temperature of 150–170° C. and steam may be introduced through line 25 in direct contact with the concentrated acid water to convert naphthalene-1-sulfonic acid to naphthalene. The thus liberated naphthalene is released as vapors from the top of desulfonator 24 through line 26 and recovered. Residual acid water containing naphthalene-2-sulfonic acid is transferred via line 27 to neutralizer 28 where it may be neutralized with alkali water from chamber 11 flowing down through lines 13 and 29 into neutralizer 28. A mixture of sodium sulfate and sodium sulfite may also be introduced through lines 31 and 29 into neutralizer 28. The effect of neutralization is to form sodium naphthalene-2-sulfonate which is sent via line 32 to fusion kettle 33 wherein it is fused with NaOH introduced through line 34 at a temperature of about 305° C. $SO_2$ gas formed by reaction of sodium sulfite with naphthalene-2-sulfonic acid is vented from neutralizer 28 through line 35. The resulting melt, sodium β-naphtholate, is sent from fusion kettle 33 through line 36 to dilution tank 37 wherein it is "drowned" or diluted with water or water containing sodium sulfate and sodium sulfite entering through line 38. After drowning the melt, the aqueous solution containing sodium sulfate and sodium sulfite is separated from the sodium β-naphtholate in a conventional manner, e.g. by filtration or centrifuging and discharged through line 39 to drier 41 and the dried sodium sulfate and sodium sulfite discharged from drier 41 through line 42 and part sent to sales and part recirculated through lines 31 and 29 to neutralizer 28. The sodium β-naphtholate is sent from tank 37 through line 44 to springing chamber 45 wherein the sodium β-naphtholate is acidified with sulfur dioxide liberated in neutralizer 28 and entering springing chamber 45 through line 35. Water containing sodium sulfate and sodium sulfite enters through line 46. β-Naphthol and sodium sulfite are transferred from springing chamber 45 via line 47 to washing chamber 48 wherein the β-naphthol is washed with water entering through line 49. The wash water containing sodium sulfite and sodium sulfate is withdrawn from chamber 48 through line 51 and recycled through line 38 to dilution tank 37 and through line 46 to springing chamber 45. The washed β-naphthol, from chamber 48 is delivered through line 52 to dehydrator 53 for removal of water and thence through line 54 to fractionator 55 from the top of which through line 56 β-naphthol vapors are removed, condensed and recovered. The minor amount of fractionator bottoms are discharged through line 57 and may be incinerated for recovery of fuel value or sent to a dump.

Equations representing the reactions in the conversion of the acid water to β-naphthol as described above are presented below:

Neutralization—

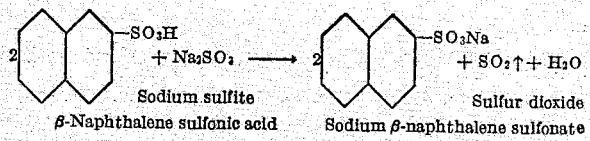

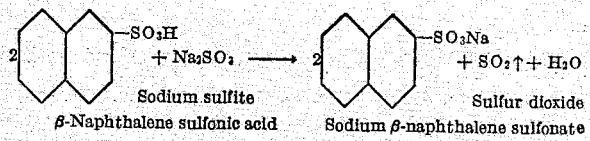

Fusion—

Springing—

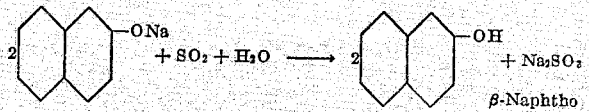

Another and alternate embodiment of the present invention employing continuous operation is schematically presented in Figure 2. In this application of the present invention, advantage is taken of the fact that a higher extraction efficiency may be achieved in a solid-liquid extraction than in a liquid-liquid extraction. "Liquid crystals" of naphthalene, generally invisible to the naked eye, begin to form at temperatures several degrees above the temperature at which visible crystals begin to form and this fact is used to achieve high extraction efficiencies and high purifications, by contacting the material to be extracted with a solvent at temperatures slightly above the crystallization point of the pure material.

Referring to Figure 2, crude naphthalene (78° C. freezing point) is introduced through line 61 into agitator tower 62 which is a tall narrow cylinder provided with multiple agitator blades 63 connected to a single rotary shaft 64 driven by motor 60. In tower 62 the crude naphthalene is contacted concurrently at about 165° C. with about 10–25 parts of concentrated sulfuric acid entering through line 65. The mixture of crude naphthalene and sulfuric acid discharges in single phase from the top of cylinder 62 through line 66 into the bottom of tower 67, which is also a tall narrow cylinder provided with agitator blades 68 fastened to a single shaft 69. Shaft 69 is rotated by motor 71 actuated by cycle-control device 72 which turns motor 71 on and off at predetermined time intervals. In tower 67 the naphthalene entering through line 66 is countercurrently washed with a dilute aqueous solution of sodium sulfate (sodium sulfate, which may be obtained from the drowning step in the β-naphthol manufacture, is used to increase the density of the water phase) at temperature slightly above 80° C. The intervals device 72 stops the agitation, the contents of the tower are allowed to settle and purified naphthalene crystals are discharged from the top of tower 67 through line 73 to the bottom of tower 74, also a tall narrow cylinder provided with agitator blades 75 fastened to a single rotary shaft 76 driven by motor 77. In tower 74 the water washed naphthalene at a temperature of about 90° C. is countercurrently treated with a 10% aqueous solution of sodium hydroxide entering through line 78. Acid water discharging from the bottom of tower 67 through line 79 may be converted to β-naphthol in a manner described in Figure 1. Alkali water discharged from the bottom of tower 74 through line 81 may also be utilized in the conversion of the acid water to β-naphthol. The treated naphthalene is discharged from tower 74 through line 82 and fractionated to produce pure naphthalene of 79.9–80.0° C. minimum freezing point.

In addition to an increase in yield of products from crude naphthalene by the process of the present invention as compared to conventional processing methods, a particular advantage of the present invention is the production at minimum cost of an especially high quality refined naphthalene (79.9° C.–80° C. freezing point). While present commercial practice dictates that refined naphthalene should have a freezing point of 79.6° C. or higher, the product is rarely significantly above the minimum value. To make "pure" naphthalene of 80.0° C. freezing point it has been conventional practice to refine 79.6° C. freezing point naphthalene with metallic sodium or sublime low sulfur content (0.1% by weight sulfur) naphthalene in large shallow iron tanks at about 150° C. A realization of the cost of these operations may be had from the fact that sublimed naphthalene flakes generally command about four cents a pound price advantage over 79.6° C. freezing point refined naphthalene. Furthermore, if the naphthalene to be sublimed contains approximately 0.25% sulfur (as is common for technical 79.6° C. freezing point naphthalene), other supplemental purification must be used. Generally this is done by treating the molten naphthalene with about 1% metallic sodium, followed by vacuum distillation.

While refined naphthalene is occasionally obtained with a very low sulfur, tar base, or tarry body content, the reliable production of such high quality naphthalene by conventional means is quite uncertain. While the exact causes for the superiority of some batches over others are not positively known, it appears to be in general a function of the expertness with which the sulfuric acid sludges are separated from the naphthalene before water washing is begun.

Since the present invention involves no acid sludges, the refined naphthalene is consistently of high quality and possesses the following advantages:

(a) Exceptionally low sulfur content (approximating 0.06–0.08% rather than 0.25% for conventionally refined naphthalene).

(b) Improved visual appearance and color stability (samples have retained a pure white color when exposed to light while conventionally refined naphthalene made from the same crude naphthalene darkened).

As a further illustration, a molten sample of refined naphthalene prepared according to the present invention was tested for color stability by insertion of a 100 ml. Nessler tube, filled to the mark, into a heating block at 200° to 205° C. A conventionally refined sample made from the same crude naphthalene was similarly tested. The color of the samples was ascertained visually at intervals in a colorimeter by comparison with standards. The method of comparison was Test Method J–10 described as "Color, B-Series Color Standards," Serial No. 842 (December 1954) in "The Manual of Barrett Test Methods," published by Barrett Division, Allied Chemical and Dye Corp., 40 Rector Street, New York city. The resulting data are shown in the table below:

COMPARISON OF COLOR STABILITIES

| Type of Naphthalene | Color After Heating | | | |
|---|---|---|---|---|
| | 0 Hours | 2 Hours | 4 Hours | 5 Hours |
| From Present Invention | B-1.5 | B-2 | B-3 | B-3 |
| By Conventional Processing | B-1.5 | B-5 | B-7.5 | B-9 |

The above data clearly show the superior stability at elevated temperatures of refined naphthalene prepared according to the present invention over conventionally refined naphthalene. This superior stability is undoubtedly due to more complete removal of impurities from the crude naphthalene by the process of the present invention.

The nature of the impurities, ordinarily present in crude naphthalene before sulfonation, is determined by the method employed to obtain the naphthalene from coal tar. Thus a 78° C. freezing point whizzed naphthalene obtained by crystallization of 73° C. freezing point naphthalene from aqueous caustic will ordinarily contain 1 to 2% thianaphthene and 2 to 4% of the other impurities comprising substituted furanes, methylnaphthalenes, dimethylnaphthalenes, and traces of tar acids and tar bases. A 78° C. freezing point naphthalene produced directly by fractional distillation of caustic washed coal tar distillate will ordinarily contain 3 to 4% thianaphthene, and 1 to 2% other impurities, chiefly tar acids. Treatment under conditions in accordance with the present invention effects complete sulfonation and polymerization of the large amount of thianaphthene present and thereby purifies the 78° C. freezing point distilled naphthalene. No acid sludge is formed, and upon washing with water and aqueous caustic, these sulfonated polymers are dissolved in the aqueous phase along with a somewhat larger amount of naphthalene sulfonic acids resulting from sulfonation of a portion of the naphthalene. Upon preparation of β-naphthol from the by-product acidic waters, the impurities are recovered as still residue in the β-naphthol distillation.

The following examples illustrate the present invention.

EXAMPLE 1

A 50 liter 3-neck round bottom flask equipped with electrical heaters, mechanical stirrer, thermometer well and addition funnel was fitted with a hot water condenser (about 80° C.) set at total reflux and topped by a cold water condenser also set at total reflux and equipped at its exit with gas scrubbing equipment. Into the flask was poured 30,000 g. of melted crude "distilled naphthalene" (F.P. 78.0° C.). The naphthalene was heated with agitation to 165° C. and 4,800 g. (16% by weight of charged naphthalene) of conc. sulfuric acid was added rapidly through the addition funnel. The mixture was agitated at 165° C. for 1.75 hours while the sulfur dioxide gas was allowed to pass through the condensers to the gas scrubbing equipment. Entrained naphthalene was separated from the gas stream by condensation and returned to the reaction flask. Water was condensed and removed (105 g.) from the gas stream as needed to maintain reaction temperature.

After completed reaction time, the single phase mixture was cooled to 90° C. and 8,910 g. of hot water was added. The mixture was agitated for 0.5 hr. at 90° C. and then allowed to settle for 0.75 hr. at 90° C. At the end of this period the lower phase acid water was siphoned off and allowed to cool. The acid water was filtered, the cake heated and the melted material from this cake returned to the reaction flask. The remaining solids (463 g.) contained 45.8% β-naphthalene sulfonic acid. The acid water filtrate weighed 16,844 g. and had the following composition:

| | |
|---|---|
| Total acidity as $H_2SO_4$ (percent) | 14.6 |
| Free $H_2SO_4$ (unutilized) (percent) | 4.9 |
| β-Naphthalene sulfonic acid (percent) | 26.1 |
| Specific gravity | 1.185 |

To the naphthalene remaining in the reaction flask was added 3000 g. of 10% sodium hydroxide solution and the mixture agitated at 83–85° C. for 0.5 hr. and then allowed to settle at the same temperature for 0.75 hr. At the end of this period the lower aqueous phase was drawn off, allowed to cool to room temperature, filtered and the filter cake sucked dry. The dried cake had the following characteristics:

| | |
|---|---|
| Weight g | 328.0 |
| Sodium β-naphthalene sulfonate percent | 45.5 |

The alkali water filtrate (2753 g.) had the following composition:

| | |
|---|---|
| Total alkalinity as NaOH (percent) | 5.3 |
| Free sulfate as $Na_2SO_4$ (percent) | 0.63 |
| Sodium β-naphthalene sulfonate (percent) | None |
| Specific gravity | 1.094 |

The washed-purified naphthalene was siphoned from the reaction flask and weighed 25,497 g.

A portion of the washed-purified naphthalene was dried and 400 g. of the dried material was subjected to fractional distillation using a 36" x 1" Stedman column, 87 mm. pressure and a 5:1 reflux ratio. Of the charged material, 90.25% was obtained as distillate and 86.68% met or surpassed specifications. The overall yield of crude to refined naphthalene was 73.68%.

Eighteen hundred g. of the acid water from this run was placed in a 3 liter 3-neck round bottom flask equipped with heating mantle, thermometer well and condenser set for distillation. The solution was concentrated until the pot temperature reached 165° and was then blown with superheated steam at 165–175° C. for 25 minutes. From the aqueous distillate 100.6 g. of naphthalene (F.P. 77.5° C.) was isolated by filtration. The steam-blown, concentrated acid water was allowed to cool to 100° C. and was then poured into 1500 ml. of water. The aqueous solution was heated almost to boiling and 1450 ml. of 18% sodium sulfite solution and 250 ml. of 16% sodium sulfite solution were added. Excess sulfur dioxide was boiled off and then 40% sodium hydroxide solution was added to pH 8. The solution was allowed to cool slowly to room temperature and the resulting slurry filtered. The wet cake contained 56% water and 36.02% sodium β-naphthalene sulfonate.

Ninety-eight and eight tenths g. of potassium hydroxide was placed in a mechanically agitated fusion pot heated by a Wood's metal bath and heated to 290° C. Then 261.5 g. of above wet cake was slowly added, keeping the temperature of the mixture at 304–305° C. After completed addition, the temperature of the mixture was held at 305° C. for 0.5 hour. The reaction mixture was then cooled and dissolved in 1300 ml. water. The aqueous solution was cooled, partly neutralized with sulfur dioxide gas, filtered, and the cake washed with 200 ml. water and discarded. Combined filtrate and water wash were acidified with sulfur dioxide until the solution gave a faintly blue color on Brom Thymol Blue test paper. The resulting slurry was filtered, the cake washed with 300 ml. water saturated with sulfur dioxide, and dried. The dried material was fractionated at 7 mm. pressure using a 6-ball Snyder column (½" I.D.). The residue freed β-naphthol obtained weighed 46.6 g. (77.7% based on mass charged to the fusion pot) and had the following characteristics:

| | |
|---|---|
| M.P. ° C | 121.9–122.5 |
| Percent α-naphthol | 0.7 |

The residue in the still pot weighed 11.6 g.

EXAMPLE 2

Part I.—Naphthalene purification

Two hundred and fifty pounds of crushed 78° C. distilled naphthalene were charged into a 50 gallon, jacketed, oil-heated, glass-lined and agitated kettle. Charge was heated to 165° C., agitation started when mass became fluid. Forty pounds (16% of the naphthalene charged) of 66° Bé. $H_2SO_4$ were rapidly added over a 15–30 minute period. Reaction was maintained after acid addition for 1¾ hours at a temperature of 165° C. in single phase.

Reaction vapors were taken off through a hot water jacketed, glass vapor line, and condensed in a glass lined condenser. Resultant condensate was collected for recovery of solidified naphthalene.

Reaction mass was then cooled to 90° C. With agitation continuing, 100 pounds (40% of naphthalene charged) of hot (90° C.) water was added. Mixing was continued for one hour after addition, and then the batch was settled for one hour, during which time the temperature was maintained at 90° C. to effect phase separation, the lower acid water was drawn off to a stainless steel container and allowed to cool for further recovery of naphthalene. Final acid water (171 pounds) was stored in glass carboys for β-naphthol processing. Acid analyses summarized as follows:

| | Percent |
|---|---|
| β-NSA | 21.4 |
| Free $SO_4^=$ as $H_2SO_4$ | 4.1 |
| Total acidity as $H_2SO_4$ | 11.8 |

The water washed naphthalene was then washed and agitated with 25 pounds (10% of naphthalene charged) of 10% caustic soda for one hour at 90° C. This was followed at the same temperature with one hour of settling. Finally the caustic (6.1% NaOH) was drawn off the bottom and collected for cooling to recover additional naphthalene. Alkali wash water (27.6 pounds) was discharged.

A sample of the resultant washed-purified naphthalene (208.6 lbs.) was distilled in a 1" x 36" laboratory Stedman column. These results summarize as follows:

a. Percent of naphthalene charged that was distilled _____ 95.9
b. Percent of naphthalene charged as 79.9° or better naphthalene _____ 71.8
c. Percent of naphthalene charged as 79.65° or better naphthalene _____ 93.7

Overall process yield, i.e. from 78° distilled naphthalene to refined naphthalene, for production of 79.6° refined naphthalene equates to 78.0%.

Part II.—β-Naphthol recovery

A. CONCENTRATION AND HYDROLYSIS

One hundred sixty-nine pounds of dilute acid water were charged into a 50 gallon, jacketed, oil-heated, glass-lined and agitated kettle. The acid water had the following analysis:

| | Percent |
|---|---|
| β-NSA | 17.3 |
| Free SO₄= as H₂SO₄ | 3.1 |
| Total acidity as H₂SO₄ | 12.3 |

Charge was heated to 165° C. to effect desired concentration; condensate was collected to recover solidified naphthalene resulting from decomposition of naphthalene sulfonic acid and distillation of dissolved naphthalene (4.9 pounds as β-NSA). Resultant concentrated acid water (57.3 pounds) had the following analysis:

| | Percent |
|---|---|
| β-NSA | 42.7 |
| Free SO₄= as H₂SO₄ | 12.6 |
| Total acidity as H₂SO₄ | 29.4 |

This concentration procedure resulted in an 84.0% actual recovery of β-NSA through this step. This concentrate was drained into stainless steel trays and allowed to harden (M.P. 90–95° C.).

B. NEUTRALIZATION AND EVAPORATION

Two 5 pound batches of the resultant concentrated acid water were charged to a 2¼ gallon steam jacketed nickel Baker-Perkins Sigma-Arm Mixer. Mass was heated to 90–95° C. to melt the batch. Neutralization was carried out by the slow addition of an 18% solution of sodium sulfite until "Congo red" test paper no longer turned blue. Care was exercised to prevent excessive foaming; temperature was maintained between 90–95° C. The mass was then steam-blown for 15 minutes to expel excess SO₂. Neutralization was then completed with a 30% solution of sodium hydroxide to an end point where "Brilliant yellow" test paper turned orange. Resultant mass was then dehydrated in this mixer; moisture content requirement was to be less than 42%. Nine hours were required to process the two batches; composite mass amounted to 11.1 pounds having the following analysis:

| | Percent |
|---|---|
| Water | 14.5 |
| NaβNS | 37.6 |

Recovery of β-NSA, corrected for handling losses, over this step was 94.0%.

C. FUSION, SPRINGING, FILTRATION, AND DISTILLATION

Six pounds of 100% sodium hydroxide was then charged to a 2 gallon, iron, direct fired agitated fusion pot. Caustic was melted by heating pot to 305° C., 10.69 pounds of the neutralized mass from the preceding step were then slowly added to the molten caustic at such a rate as to maintain the temperature between 290–310° C. Molar ratio of caustic to NaβNS was 8.6; or on the basis of total dry salts as charged, it was 3.23. The fusion mass was then held at 305° C. for ½ hour after the addition of salt was completed. The mass (15.87 pounds) was then cooled to room temperature and transferred to a stainless tray.

Water (47.6 pounds) and the fusion mass (15.87 pounds) were then charged at a 3:1 weight ratio to a 10 gallon stainless steel steam jacketed and agitated kettle. The mixture was then heated to 95° C. with agitation. Sulfur dioxide (4.88 pounds) was then bubbled through the mass from the bottom outlet valve until "Brom Thymol Blue" test paper remained yellow. The contents (65.1 pounds) were then cooled slowly to room temperature and filtered on a Nutsche type filter. Resultant cake (crude β-naphthol) was then washed with water; final weight was 6.31 pounds having 51.1% volatiles at 60° C.

An aliquot of the filter cake was then dried in the laboratory at 60° C. This equated to 3.09 pounds of dry cake having 63.2% β-naphthol based on final distillation with 2.1% α-naphthol in the β-naphthol. The dry cake aliquot was then distilled in a six-ball Snyder column with internal reflux for rectification.

Overall yield on β-NSA for the fusion, springing and distillation steps was 77.3%. This results in a 72.5% yield from the concentrated acid water.

EXAMPLE 3

Part I.—Naphthalene purification

Two hundred and fifty pounds of crushed 78° C., distilled naphthalene were charged into a 50 gallon, jacketed, oil-heated, glass-lined and agitated kettle. Charge was heated to 165° C.; agitation started when mass became fluid. Forty pounds (16% of the naphthalene charged) of 95.5–96.5% C.P. sulfuric acid were rapidly added over a 15–30 minute period. Reaction was maintained after acid addition for 1¾ hours at a temperature of 165° C.

Reaction vapors were taken off through a hot water jacketed, glass vapor line, and condensed in a glass-lined condenser. Resultant condensate was collected for recovery of solidified naphthalene.

Reaction mass was then cooled to 90° C. With agitation continuing, 100 pounds (40% of naphthalene charged) of hot (90° C.) water was added. Mixing was continued for one hour after addition, and then the batch was settled for one hour, during which time the temperature was maintained at 90° C. to effect phase separation, the lower acid water was drawn off to a stainless steel container and allowed to cool for further recovery of naphthalene. Final acid water (181.9 pounds) was stored in glass carboys for β-naphthol processing. Acid analyses summarized as follows:

| | Percent |
|---|---|
| β-NSA | 17.3 |
| Free SO₄= as H₂SO₄ | 3.1 |
| Total acidity as H₂SO₄ | 12.3 |

The water washed naphthalene was then washed and agitated with 25 pounds (10% of naphthalene charged) of 10% caustic soda for one hour at 90° C. This was followed at the same temperature with one hour of settling. Finally the caustic wash (9.2% NaOH) was drawn off the bottom and collected for cooling to recover additional naphthalene. This alkali wash water (19.8 pounds) was discharged.

A sample of the resultant washed-purified naphthalene (201.5 pounds) was distilled in a 1″ x 36″ laboratory Stedman column. These results summarize as follows:

a. Percent of naphthalene charged was distilled __ 97.8
b. Percent of naphthalene charged as 79.95° or better naphthalene _____ 85.2
c. Percent of naphthalene charged as 79.9° or better naphthalene _____ 88.9
d. Percent of naphthalene charged as 79.85° or better naphthalene _____ 92.0
e. Percent of naphthalene charged as 79.8° or better naphthalene _____ 95.3

Overall process yield, i.e. from 78° distilled naphthalene to refined naphthalene, for production of 79.6° refined naphthalene equates to 77.3%.

Part II.—β-naphthol recovery

A. CONCENTRATION AND HYDROLYSIS

One hundred sixty-five pounds of dilute acid water were charged into the 50 gallon, jacketed, oil-heated, glass-lined and agitated kettle. This acid water had the following analysis:

| | Percent |
|---|---|
| β-NSA | 16.2 |
| Free SO₄= as H₂SO₄ | 4.9 |
| Total acidity as H₂SO₄ | 14.3 |

Charge was heated to 165° C. to effect desired concentration; condensate was collected to recover solidified naphthalene resulting from decomposition of naphthalene sulfonic acid and distillation of dissolved naphthalene (6.5 pounds as β-NSA). Resultant concentrated acid water (69 pounds) had the following analysis:

| | Percent |
|---|---|
| β-NSA | 34.2 |
| Free $SO_4^=$ as $H_2SO_4$ | 14.3 |
| Total acidity as $H_2SO_4$ | 35.2 |

This concentration procedure resulted in an 88.4% actual recovery of β-NSA through this step. The concentrate was then drained from the kettle into stainless steel trays and allowed to harden (M.P. 90–95° C.).

B. NEUTRALIZATION AND EVAPORATION

A fifteen pound batch of blended concentrated acid water resulting from concentration as described above, and from an additional steam-blowing to effect hydrolysis of α-naphthol was charged to a 10 gallon stainless steel jacketed and agitated kettle. Mass was heated to 90–95° C. to melt the batch. Neutralization was carried out by the slow addition of an 18% solution of sodium sulfite until "Congo red" test paper no longer turned blue. Care was exercised to prevent excessive foaming; temperature was maintained between 90–95° C. The mass was then steam-blown for 15 minutes to expel excess $SO_2$. Neutralization was then completed with a 30% solution of sodium hydroxide to an end point where "Brilliant yellow" test paper turned orange. Quantities were as follows:

| | Pounds |
|---|---|
| Charge | 15 |
| β-NSA in charge | 6.47 |
| 18% sodium sulfite solution | 37 |
| 30% sodium hydroxide solution | 2 |

Resultant mass was discharged onto trays and dehydrated in a tray drier for 44 hours to a moisture content of 0.8%. Dried material amounted to 18.4 pounds containing 33.8% NaβNS.

Recovery of β-NSA over this step was 87.0%.

C. FUSION, SPRINGING, FILTRATION, AND DISTILLATION

Eleven pounds of 100% potassium hydroxide was then charged to a 2 gallon, iron, direct fired, agitated fusion pot. Caustic potash was melted by heating pot to 310° C. Fifteen pounds of neutralized mass from the preceding step were then slowly added to the molten caustic potash at such a rate as to maintain the temperature between 290–310° C. Molar ratio of KOH to NaβNS was 9.0; or on the basis of total dry salts as charged, it was 3.01. The fusion mass was then held at 310° C. for ½ hour after the addition of salt was completed. The mass (24.44 pounds) was then cooled to room temperature and transferred to a stainless tray.

Water (73.2 pounds) and the fusion mass (24.44 pounds) were then charged at a 3:1 weight ratio to a 10 gallon stainless steel, steam jacketed and agitated kettle. The mixture was heated to 95° C., with agitation. Sulfur dioxide (6.44 pounds) was then bubbled through the mass from the bottom outlet valve until "Brom Thymol Blue" test paper remained yellow. The contents (101.6 pounds) were then cooled slowly to room temperature and filtered on a Nutsche type filter. Resultant cake (crude β-naphthol) was then washed with water; final weight was 14.0 pounds having 66.9% volatiles at 60° C. An aliquot of the filter cake was then dried in the laboratory at 60° C. The resultant equated the cake (dried) to 4.64 pounds having 53.2% β-naphthol based on final distillation, with 0.54% β-naphthol in the β-naphthol. The dry cake aliquot was then distilled in a six-ball Snyder column with internal reflux for rectification.

Overall yield in β-NSA for the fusion, springing, and distillation steps was 78.3%. This results in a 68.0% yield from the concentrated acid water.

EXAMPLE 4

Part I.—Naphthalene purification

Two hundred and fifty pounds of crushed 78° distilled naphthalene were charged into a 50 gallon, jacketed, oil heated, glass-lined and agitated kettle. Charge was heated to 165° C.; agitation started when mass became fluid. Forty pounds (16% of the naphthalene charged) of 66° Bé. sulfuric acid were rapidly added over a 15-30 minute period. Reaction was maintained after acid addition for 1¾ hours at a temperature of 165° C.

Reaction vapors were taken off through a hot water jacketed, glass vapor line, and condensed in a glass-lined condenser. Resultant condensate was collected for recovery of solidified naphthalene.

Reaction mass was then cooled to 90° C. With agitation continuing, 100 pounds (40% of naphthalene charged) of hot (90° C.) water was added. Mixing was continued for one hour after addition, and then the batch was settled for one hour, during which time the temperature was maintained at 90° C.

A phase separation was then made. The lower acid water was drawn off to a stainless steel container and allowed to cool for further recovery of naphthalene. Final acid water (182 pounds) was stored in glass carboys for β-naphthol processing. Acid analyses summarized as follows:

| | Percent |
|---|---|
| β-NSA | 17.3 |
| Free $SO_4^=$ as $H_2SO_4$ | 3.1 |
| Total acidity as $H_2SO_4$ | 12.3 |

The water washed naphthalene was then washed and agitated with 25 pounds (10% of naphthalene charged) of 10% caustic soda for one hour at 90° C. This was followed at the same temperature with one hour of settling. Finally, the caustic wash (9.2% NaOH) was drawn off the bottom and collected for cooling to recover additional naphthalene. This alkali wash water (19.8 pounds) was discharged.

A sample of the resultant wash-purified naphthalene (201.5 pounds), was distilled in a 1" x 36" laboratory Stedman column. These results summarize as follows:

a. Percent of naphthalene charged that was distilled _____ 97.8
b. Percent of naphthalene charged as 79.9° or better naphthalene _____ 88.9
c. Percent of naphthalene charged as 79.8° or better naphthalene _____ 95.3

Overall process yield, i.e., from 78° naphthalene to refined naphthalene, for the production of 79.6° refined naphthalene equates to 77.3%.

Part II.—β-Naphthol recovery

A. CONCENTRATION

One hundred and sixty-nine pounds of dilute acid water were charged into the 50 gallon, jacketed, oil-heated, glass-lined and agitated kettle. This acid water had the following analysis:

| | Percent |
|---|---|
| β-NSA | 17.3 |
| Free $SO_4^=$ as $H_2SO_4$ | 3.1 |
| Total acidity as $H_2SO_4$ | 12.3 |

Charge was heated to 165° C. to effect desired concentration; condensate was collected to recover solidified naphthalene resulting from decomposition of naphthalene sulfonic acid and distillation of dissolved naphthalene.

Resultant concentrated acid water (57.3 pounds) had the following analysis:

| | Percent |
|---|---|
| β-NSA | 42.7 |
| Free SO$_4$= as H$_2$SO$_4$ | 12.6 |
| Total acidity as H$_2$SO$_4$ | 29.4 |

This concentration procedure resulted in an 84% actual recovery of β-NSA through this step. The concentrate was then drained from the kettle into stainless steel trays and allowed to harden.

B. NEUTRALIZATION AND EVAPORATION

Two five pound batches of the resultant concentrated acid water were charged to a 2¼ gallon, steam jacketed nickel Baker Perkins Sigma-Arm Mixer. Mass was heated to 90–95° C. to melt the batch. Neutralization was carried out by the slow addition of an 18% solution of sodium sulfite until "Congo red" test paper no longer turned blue. Care was exercised to prevent excessive foaming; temperature was maintained between 90–95° C. The mass was then steam-blown for 15 minutes to expel excess SO$_2$. Neutralization was then completed with a 30% solution of sodium hydroxide to an end point where "Brilliant yellow" test paper turned orange. Quantities were as follows:

| | Pounds |
|---|---|
| Charge | 10 |
| β-NSA in charge | 4.26 |
| 18% sodium sulfite solution | 23.1 |
| 30% sodium hydroxide solution | 1.19 |

Resultant mass was dehydrated in this mixer; for a period of nine hours. Dried material amounted to 11.1 pounds. Recovery of β-NSA, corrected for handling losses, over this step was 94.0%.

C. FUSION, SPRINGING, FILTRATION, AND DISTILLATION

Six pounds of 100% sodium hydroxide was then charged to a 2 gallon, iron, direct fired, agitated fusion pot. Caustic was melted by heating pot to 305° C., 10.69 pounds of the neutralized mass from the preceding step were then slowly added to the molten caustic at such a rate as to maintain the temperature between 290–310° C. Molar ratio of caustic to NaβNS was 8.6; or on the basis of total dry salts as charged, it was 3.23. The fusion mass was then held at 305° C. for ½ hour after the addition of salt was completed. The mass (15.87 pounds) was then cooled to room temperature and transferred to a stainless steel tray.

Water (47.6 pounds) and the fusion mass (15.87 pounds) were then charged at a 3:1 weight ratio to a 10 gallon stainless steel jacketed and agitated kettle. The mixture was then heated to 95° C. with agitation. Sulfur dioxide (4.88 pounds) was then bubbled through the mass from the bottom outlet valve until "Brom Thymol Blue" test paper remained yellow. The contents (65.1 pounds) were then cooled slowly to room temperature and filtered. Resultant cake (crude β-naphthol) was then washed with water; final weight was 6.31 pounds having 51.1% volatiles at 60° C. An aliquot of the filter cake was dried in the laboratory at 60° C. Weight of the dry cake was 3.09 pounds.

The dry cake aliquot was then distilled at reduced pressure in a six-ball Snyder column to obtain residue-freed β-naphthol containing 0.75% α-naphthol.

Overall yield of β-NSA for the fusion, springing and distillation was 77.3%. This results in a 72.5% yield from the concentrated acid water.

The residue-freed β-naphthol was fractionated at reduced pressure in a 1″ x 36″ laboratory Stedman column. Refined β-naphthol (0.24% α-naphthol) was obtained in 94.1% yield. A further portion of material (2.98% of the charge) contained 17.64% α-naphthol and could have been further processed for that product.

Although certain preferred embodiments of the invention have been disclosed for purpose of illustration, it will be evident that various changes and modifications may be made therein without departing from the scope and spirit of the invention.

I claim:

1. A process for the treatment of crude naphthalene for the production of high purity naphthalene and the conversion of waste products therefrom into substantial amounts of β-naphthol which comprises subjecting crude naphthalene with 10–25 parts by weight of crude naphthalene of concentrated sulfuric acid at a temperature of 150–170° C. to violent agitation to effect intimate contact between the crude naphthalene and sulfuric acid to form essentially a single phase, i.e. a homogeneous mixture that does not separate into layers, thereafter adding water to the single phase mixture at a temperature of 80–100° C. to form an acid water aqueous phase containing naphthalene sulfonic acids, impurities and a naphthalene phase, withdrawing the aqueous phase, washing the thus separated naphthalene phase with an aqueous caustic solution, withdrawing the aqueous caustic solution after contact with the naphthalene, fractionally distilling the thus treated naphthalene and recovering as distillate a high quality naphthalene, passing steam in direct contact with said acid water at a temperature of 150–170° C. to convert naphthalene-1-sulfonic acid contained in the acid water to naphthalene, removing said naphthalene from the acid water, neutralizing the residual acid water containing naphthalene-2-sulfonic acid to produce sodium naphthalene-2-sulfonate, fusing the sodium naphthalene-2-sulfonate with sodium hydroxide to effect desulfonation of the sodium naphthalene-2-sulfonate to sodium β-naphtholate, diluting the melt with water and acidifying the sodium β-naphtholate to form β-naphthol, and recovering the β-naphthol.

2. A process for the treatment of crude naphthalene for the production of high purity naphthalene and the conversion of waste products therefrom into substantial amounts of β-naphthol which comprises subjecting crude naphthalene with 10–25 parts by weight of crude naphthalene of concentrated sulfuric acid at a temperature of 150–170° C. to violent agitation to effect intimate contact between the crude naphthalene and sulfuric acid to form essentially a single phase, i.e., a homogeneous mixture that does not separate into layers, thereafter adding water to the single phase mixture at a temperature of 80–100° C. to form an acid water aqueous phase containing naphthalene sulfonic acids, impurities and a naphthalene phase, withdrawing the aqueous phase, washing the thus separated naphthalene phase with an aqueous caustic solution, withdrawing the aqueous caustic solution after contact with the naphthalene, fractionally distilling the thus treated naphthalene and recovering as distillate a high quality naphthalene, concentrating said acid water by evaporation, passing steam in direct contact with the concentrated acid water at a temperature of 150–170° C. to convert naphthalene-1-sulfonic acid contained in the acid water to naphthalene, removing said naphthalene by vaporization from the acid water, neutralizing the residual waste water containing naphthalene-2-sulfonic acid with said aqueous caustic solution resulting from washing said naphthalene phase and a mixture of sodium sulfate and sodium sulfite to produce sodium naphthalene-2-sulfonate and sulfur dioxide gas, separating the sulfur dioxide gas from the reaction mixture, fusing said naphthalene-2-sulfonate with sodium hydroxide at a temperature of about 290°–350° C. to effect desulfonation of the sodium naphthalene-2-sulfonate to sodium β-naphtholate, diluting the melt resulting from the fusion with water and acidifying with said sulfur dioxide to convert the sodium β-naphtholate to β-naphthol which separates as one layer and an aqueous solution of sodium sulfate and sodium sulfite, recycling said aqueous solution of sodium sulfate and sodium sulfite for neutralizing the naphthalene-2-sulfonic acid to produce the sodium naphthalene-2-sulfonate, and recovering said β-naphthol.

3. A process for the treatment of crude naphthalene for the production of high purity naphthalene and the conversion of waste products therefrom into substantial amounts of β-naphthol which comprises subjecting crude naphthalene with 14-20 parts by weight of crude naphthalene of concentrated sulfuric acid containing 93-96% $H_2SO_4$ at a temperature of 155-165° C. to violent agitation to effect intimate contact between the crude naphthalene and sulfuric acid to form essentially a single phase, i.e., a homogeneous mixture that does not separate into layers, thereafter adding water to the single phase mixture at a temperature of 85-90° C. to form an acid water aqueous phase containing naphthalene sulfonic acids, impurities and a naphthalene phase, withdrawing the aqueous phase, washing the thus separated naphthalene phase with an aqueous caustic solution, withdrawing the aqueous caustic solution after contact with the naphthalene, fractionally distilling the thus treated naphthalene and recovering as distillate a high quality naphthalene, concentrating said acid water by evaporation, passing steam in direct contact with the concentrated acid water at a temperature of 150-170° C. to convert naphthalene-1-sulfonic acid contained in the acid water to naphthalene, removing said napthalene by vaporization from the acid water, neutralizing the residual waste water containing naphthalene-2-sulfonic acid with said aqueous caustic solution resulting from washing said naphthalene phase and a mixture of sodium sulfate and sodium sulfite to produce sodium naphthalene-2-sulfonate and sulfur dioxide gas, separating the sulfur dioxide gas from the reaction mixture, fusing said naphthalene-2-sulfonate with sodium hydroxide at a temperature of about 290-350° C. to effect desulfonation of the sodium naphthalene-2-sulfonate to sodium β-naphtholate, diluting the melt resulting from the fusion with water and acidifying with said sulfur dioxide to convert the sodium β-naphtholate to β-naphthol which separates as one layer and an aqueous solution of sodium sulfate and sodium sulfite, recycling said aqueous solution of sodium sulfate and sodium sulfite for neutralizing the naphthalene-2-sulfonic acid to produce the sodium naphthalene-2-sulfonate, and recovering said β-naphthol.

4. A process for the treatment of crude naphthalene for the production of high purity naphthalene which comprises subjecting crude naphthalene with 10-25 parts by weight of crude naphthalene of concentrated sulfuric acid at a temperature of 150-170° C. to violent agitation to effect intimate contact between the crude naphthalene and sulfuric acid to form essentially a single phase, i.e. a homogeneous mixture that does not separate into layers, thereafter adding water to the single phase mixture at a temperature of 80-100° C. to form an acid water aqueous phase containing naphthalene sulfonic acids, impurities and a naphthalene phase, withdrawing the aqueous phase, washing the thus separated naphthalene phase with an aqueous caustic solution, withdrawing the aqueous caustic solution after contact with the naphthalene, and fractionally distilling the thus treated naphthalene, and recovering as distillate a high quality naphthalene.

5. A process for the treatment of crude naphthalene for the production of high purity naphthalene which comprises subjecting crude naphthalene with 14-20 parts by weight of crude naphthalene of concentrated sulfuric acid containing 93-96% $H_2SO_4$ at a temperature of 155-165° C. to violent agitation to effect intimate contact between the crude naphthalene and sulfuric acid to form essentially a single phase, i.e. a homogeneous mixture that does not separate into layers, thereafter adding water to the single phase mixture at a temperature of 85-95° C. to form an acid water aqueous phase containing naphthalene sulfonic acids, impurities and a naphthalene phase, withdrawing the aqueous phase, washing the thus separated naphthalene phase with an aqueous caustic solution, withdrawing the aqueous caustic solution after contact with the naphthalene, and fractionally distilling the thus treated naphthalene and recovering as distillate a high quality naphthalene.

References Cited in the file of this patent

UNITED STATES PATENTS

| | | |
|---|---|---|
| 1,481,197 | Gould | Jan. 15, 1924 |
| 2,334,500 | Miller | Nov. 16, 1943 |
| 2,760,992 | Schoeffel et al. | Aug. 28, 1956 |